Sept. 22, 1953         J. JOHNSON         2,652,686
FUEL SYSTEM FOR AIRCRAFT PROPULSION MEANS
Filed June 10, 1949         3 Sheets-Sheet 1

Inventor
John Johnson

By
ATTORNEY

Sept. 22, 1953    J. JOHNSON    2,652,686
FUEL SYSTEM FOR AIRCRAFT PROPULSION MEANS
Filed June 10, 1949    3 Sheets-Sheet 2
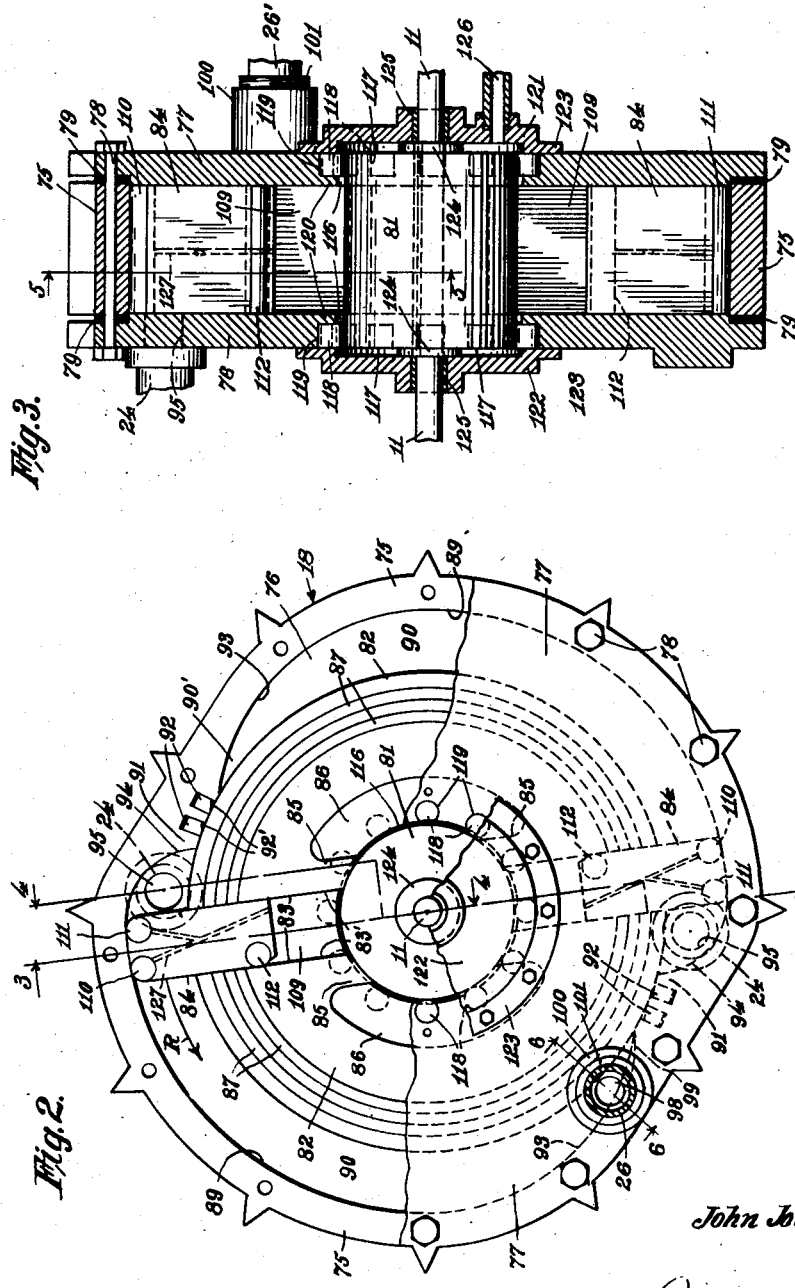
Inventor
John Johnson
By
ATTORNEY

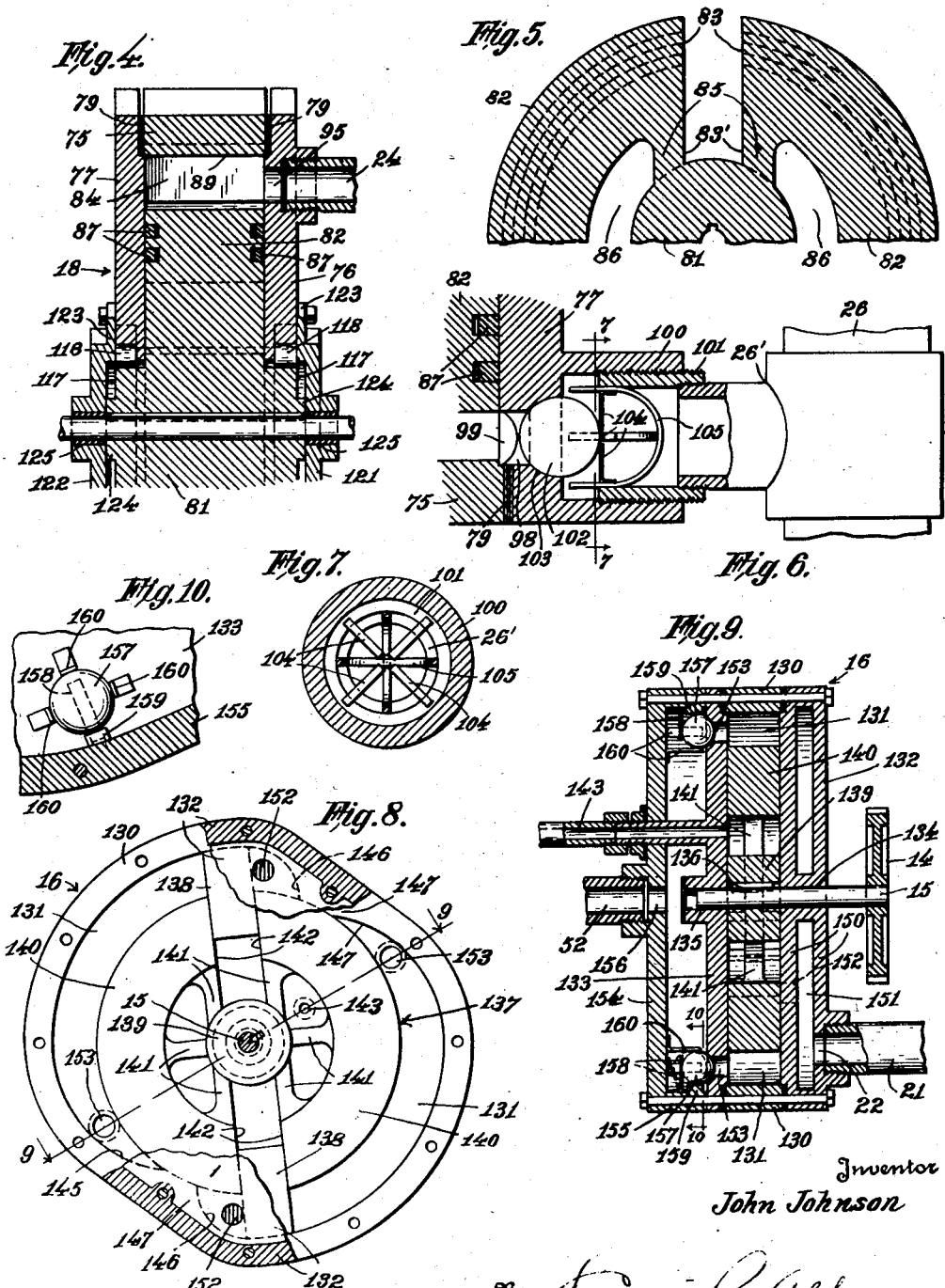

Patented Sept. 22, 1953

2,652,686

UNITED STATES PATENT OFFICE 2,652,686

FUEL SYSTEM FOR AIRCRAFT PROPULSION MEANS

John Johnson, Spokane, Wash.

Application June 10, 1949, Serial No. 98,372

4 Claims. (Cl. 60—39.28)

This invention relates to an improved system for delivering fuel under pressure to aircraft propulsion means.

The improved fuel system embodying the present invention is designed for use in conjunction with aircraft propulsion means such as rotary engines and jet motors, wherein the fuel charge is delivered thereto under pressure; and is not to be confused with systems for delivering a fuel mixture to engines of a type employing a compression stroke.

The object of the present invention is to provide an improved fuel system for aircraft propulsion means, wherein the pressure and richness of the fuel mixture will remain substantially constant irrespective of the altitude of the craft.

A further object of the invention is to provide a fuel system as mentioned which shall be dependable in operation under all conditions to which the same may be subjected.

A further object of the invention is to provide a novel air compressor forming a part of the fuel system.

A further object is to provide a novel fuel pump forming a part of the system.

Other objects will appear hereinafter.

The invention will be more readily understood by reference to the accompanying drawings forming a part of this specification and in which:

Fig. 2 is an end elevation of the air compressor forming a part of the system, parts of the casing being broken away, Fig. 3 is a section on substantially the line 3—3 of Fig. 2, the vanes and hub of the rotor being shown in elevation.

Fig. 4 is a detail section on substantially the line 4—4 of Fig. 2,

Figure 1:
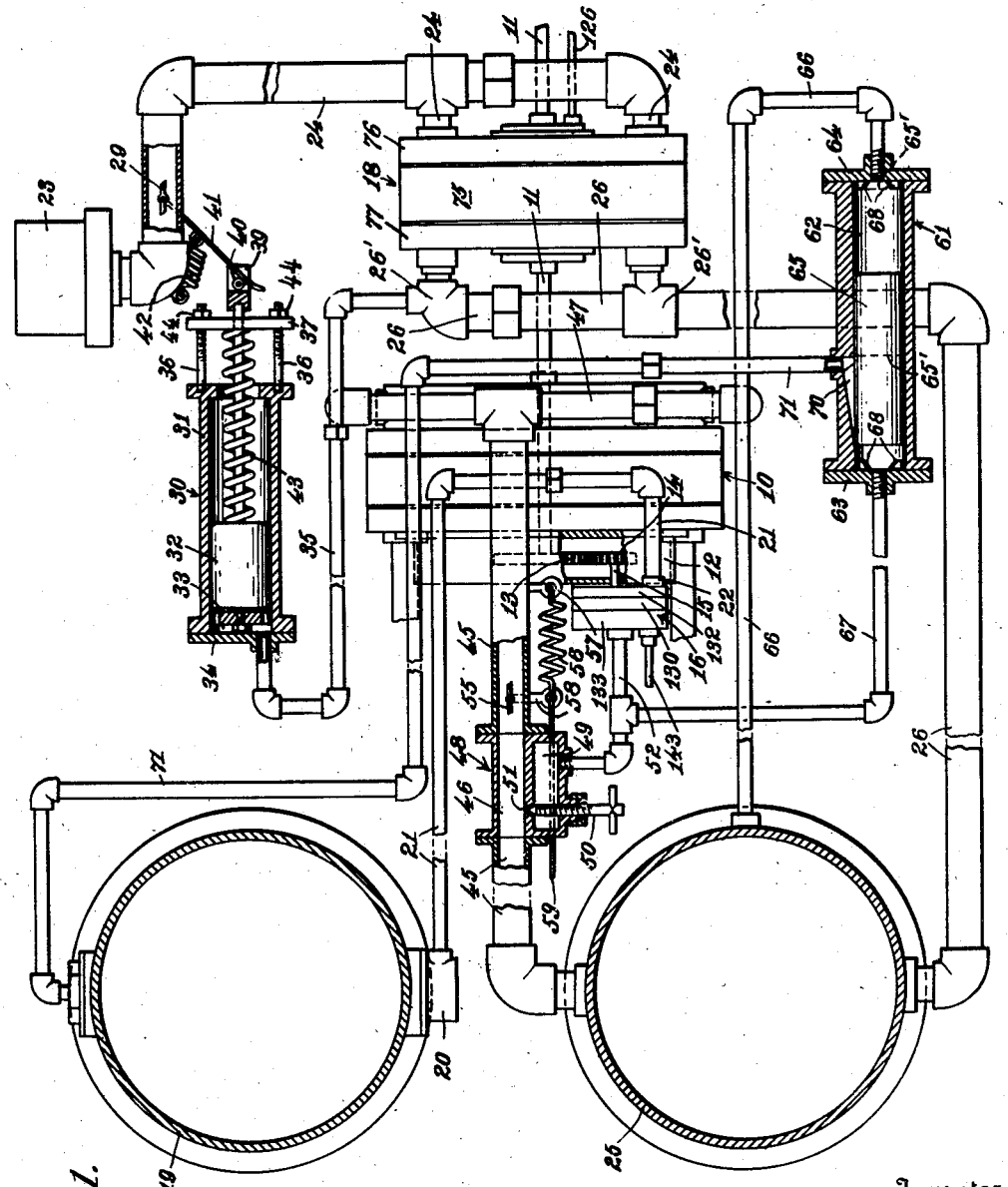
Fig. 1 is a diagrammatic view illustrating the general layout and combination of elements embodying the present invention.

Fig. 5 is a detail section of a portion of the rotary element of the air compressor, the section being taken on substantially the line 5—5 of Fig. 3, Fig. 6 is a detail section through one of the air exhaust ports, the section being taken on the line 6—6 of Fig. 2, and illustrated upon an enlarged scale, Fig. 7 is a section on the line 7—7 of Fig. 6, but illustrating a slight modification, Fig. 8 is an end view of the fuel compressor with the greater portion of the adjacent end element removed, and the remaining portions of said element illustrated in section, Fig. 9 is a section on the line 9—9 of Fig. 8, with the end element in place, and Fig. 10 is a detail section on substantially the line 10—10 of Fig. 9, and illustrated upon an enlarged scale.

Referring to the drawings 10 indicates diagrammatically a propulsion motor for an aircraft, which is indicated in the drawings as a rotary engine; although it is to be understood that a jet motor may be substituted in place thereof without departing from the scope of the invention. The shaft 11 of the motor 10 projects at one end into a gear casing 12 and is provided with a gear 13 which meshes with a pinion 14 on the shaft 15 of the fuel pump 16. The opposite end of the motor shaft 11 constitutes means for driving an air compressor 18.

A fuel tank 19 is connected through a filter 20 and feed pipe 21 to the inlet 22 of the fuel pump 16 which will be more fully described hereinafter. See Fig. 9.

Air is admitted to the air compressor 18 through an air filter 23 and inlet ducts 24; and is delivered from the compressor to a compressed air tank 25 through a compressed air duct 26. Located in the air inlet duct 24 is a butterfly valve 29 controlled by an air governor 30.

The air governor 30 comprises generally a cylinder 31, a piston 32 therein having suitable packing 33, and means connecting said piston to said valve 29 for actuating the same. The cylinder 31 is provided at one end with a head 34; and an air pipe 35 connects the space between said head and the piston 32 with the air compression pipe 26. The opposite end of the cylinder 31 is open to the atmosphere, and extending longitudinally therefrom are threaded rods 36 upon which is mounted a yoke 37. A rod 38 extends from the piston 32 through said yoke 37 and is provided at its outer end with a bifurcated head 39 carrying an antifriction roller 40 engaged by an arm 41 connected to the valve 29. A spring 42 maintains the arm 41 in engagement with the roller 40 and tends to hold the valve 29 in open position.

Interposed between the piston 32 and yoke 37 is a spring 43 which tends to force the piston inwardly against the pressure of air in the closed end of the cylinder 31. The pressure of the spring 43 and consequently the pressure necessary to actuate the valve 29 may be regulated by means of the nuts 44 threaded upon the rods 36, and which constitute adjustable stops for the yoke 37. The operation of this portion of the device will be more fully described hereinafter.

An air duct 45 extends from the air pressure tank 25 to the inlet manifold pipes 47 of the motor 10; and interposed in said duct is the mixing chamber 46 of a carburetor 48. The carburetor comprises the mixing chamber 46, a fuel chamber 49, and a needle valve 50 controlling a fuel orifice 51 between the fuel and mixing chambers 49 and 46 respectively. The mixing chamber 46 of the carburetor constitutes a duct in alignment with the air duct 45 and forms a portion thereof.

A fuel delivery pipe 52 conducts the liquid fuel from the fuel pump 16 to the chamber 49 of the carburetor under full pressure of the pump. With each opening of the inlet to the combustion chamber or chambers of the motor 10, in the usual manner, a surge of air is forced through the air duct 45 and mixing chamber 46, and a jet of liquid fuel is sprayed under pressure through the orifice 51 to become mixed with the air.

When the present system is employed in conjunction with a jet motor for driving an aircraft, a constant flow of fuel and air mixture is delivered under pressure to the motor. Under such conditions a constant spray of liquid fuel is delivered through the orifice 51 of the carburetor instead of the intermittent jets as above described when used with a rotary engine.

A throttle valve 55 is arranged in the duct 45 and is normally held in closed position by a spring 56 having one end fixed, as to an eye 57, and the other end connected to an actuating lever 58 fixed to the stem of the valve. An accelerator rod 59 is connected to the lever 58 and is actuated in the usual manner at the option of the operator to open the valve 55 to the desired extent. In the drawing the valve is illustrated in fully open position.

In order to maintain the liquid fuel and air at a uniform or balanced pressure, a fuel governor 61 is provided. Said fuel governor comprises generally a cylinder 62 closed at its opposite ends by heads 63 and 64 respectively, and a piston 65. A pipe 66 extends from the compressed air tank 25 and communicates through the head 64 with one end of the cylinder 62; and a duct 67 extends from the compressed fuel pipe 52 and communicates with the opposite end of said cylinder. It is obvious that any variation between the air pressure and the fuel pressure will cause the piston 65 to shift longitudinally in the cylinder 62. Lugs 68 on the cylinder heads 63 and 64 prevent the piston from coming in contact with said heads and thereby assures full fluid pressure against the ends of the piston at all times.

The wall of the cylinder 62 is provided with a longitudinally tapered port 70 which gradually increases in cross-sectional area from adjacent the fuel entry end of the cylinder to a position cleared by the piston 65 when at the extreme end of movement toward the air end of the cylinder, as indicated by the dotted lines 65'. The port 70 communicates through a pipe 71 with the upper portion of the fuel tank 19, the pipes 67 and 71 together constituting a by-pass from the delivery side of the fuel pump to the fuel tank.

When the relative pressures of the fuel from the fuel pump 16 and that of the air in the tank 25 is normal, the piston 65 rests in the position shown in full lines. Should the fuel pump build up a greater than normal pressure and supply more fuel than is being used at the carburetor, the piston 65 will be pushed back thereby opening the port 70, and the excess fuel will be returned to the fuel tank through the pipe 71; and the air and fuel pressures will thereby be maintained at the normal ratio.

Should the air pressure increase above the normal ratio of consumption, the pressure will build up in the cylinder 30 causing the piston 32 to move against the tension of the spring 43, and operate the valve 29 to reduce the volume of air admitted to the air pump 18. The air governor 30 and fuel governor 61 will therefore maintain the normal relative pressures of the air and fuel irrespective of the altitude or other atmospheric conditions. At high altitudes, where the air is rarer and contains less oxygen per cubic volume than at lower altitudes, a greater volume of air is necessary to maintain the required pressure and to supply the necessary oxygen to the fuel being consumed. At such times the valve 29 is maintained in fully open position by the spring 43; and the excess fuel is returned to the fuel tank as above described. At lower altitudes, where the air is more dense, the same working speed of the engine will tend to increase the pressure in the air tank, but the air control governor 30 will actuate the valve 29 to maintain the normal pressure.

The air compressor 18, which comprises a portion of the fuel system, is illustrated in detail in Figs. 2 to 7 inclusive of the drawings; and consists generally of a suitable casing, a driven rotor and a pair of radially disposed vanes. The casing comprises a substantially annular body portion 75 and end plates 76 and 77 on the air inlet and air delivery sides respectively of the compressor. Bolts 78 secure the end plates to the body 75, and interposed shims 79 provide means for taking up wear to maintain a close fit between the end plates 76 and 77 and the rotor.

The rotor comprises a cylindrical hub 81 and a body portion consisting of two substantially semi-cylindrical sections 82—82. The body sections 82—82, which fit between the casing end plates 76—77, is of less width than the hub 81 and is preferably arranged substantially midway between the ends thereof, as illustrated in Fig. 4. The adjacent ends of the body portions 82 are spaced apart and form parallel bearing surfaces 83 between which are slidably mounted vanes 84.

The body portions 82 of the rotor are spaced radially from the hub 81, and are preferably integrally connected thereto by spokes 85 formed at the ends of the portions 82. The adjacent faces 83' of said spokes form continuations of the bearing end faces 83 as shown in Figs. 2 and 5. By spacing the body portions 82 from the hub 81, oil spaces 86 are provided for a purpose hereinafter described. Arcuate packing members 87 are provided in the lateral faces of the body portions 82, and engage the inner faces of the casing end plates 76, 77.

The inner face 89 of the casing member 75 constitutes the bearing face for the outer ends of the vanes 84, and is radially spaced from the periphery of the rotor, forming a pair of similar arcuate compression chambers 90 separated at their adjacent ends by stationary abutments 91 formed integrally on the casing member 75 and extending inwardly to the rotor. Transverse packing elements 92 are provided in said abutments.

The rotor, with the vanes 84 carried thereby, turns in the direction of the arrow R shown in Fig. 2; and at the approach sides of the abutments, which constitute the discharge ends of the compression chambers 90, the face 89 of the casing curves gradually inwardly as at 93 to ease the vanes over the abutments. On the opposite sides of the abutments, which are the air inlet ends of the compression chambers 90, the bearing faces curve abruptly away from the abutments, as at 94; and the air inlet pipes 24 communicate with the compression chambers 90 through inlet ports 95 in the end plate 76 arranged closely to the curved portion 94.

Compressed air delivery ports 98 extend through the end plate 77 of the casing adjacent the tapered delivery ends 90' of the compression chambers and communicate with the delivery pipe 26 leading to the air tank 25.

In order that the delivery ports 98 shall be of ample diameter and unobstructed, said ports are arranged a short distance from the tapered ends of the chambers; and as said ports when so arranged will be completely covered by the vanes before the vanes reach the ends of the chambers, by-passes 99 are provided in the plate 77 extending from each port 98 to the end of the chamber, so that all the air in the chambers will be forced to the discharge ports.

A collar 100 is provided on the end plate 77 at each of the discharge ports 98, and into which said ports discharge; and reducing nipples 101 couple the collars 100 to fittings 26' on the pipe 26 leading to the compressed air tank 25. See Fig. 6. A ball check valve 102 is provided at each discharge port 98 which valve is normally held upon a valve seat 103 by springs 104. The springs 104 may be fixed upon a valve guide 105 as illustrated in Fig. 6; or they may be attached directly to the reducing nipple 101 as shown in Fig. 7.

As the body portions 82 of the rotor fit snugly between the inner faces of the end plates 76 and 77 of the casing, said end faces, together with the parallel surfaces of the rotor body sections, form radial chambers 109 in which the vanes are slidably mounted. The vanes are impelled outwardly by fluid pressure, as will be described hereinafter, so as to maintain the outer ends thereof in constant yielding engagement with the inner face 89 of the casing member 75.

Each vane is provided at its outer end with a pair of transverse anti-friction rollers 110 and 111 arranged at the forward and rear edges thereof respectively, to minimize the wear as the vanes pass over the abutments 91 and inclined faces 93 and 94; and a third transverse roller 112 is arranged in the forward face of the vane adjacent the inner end thereof to minimize the wear as the vane is forced inwardly.

The ends of the hubs 81, which project beyond the body portions 82 of the rotor, extend into apertures 116 in the end plates 76 and 77, and terminate with the end faces 117 thereof substantially flush with the outer faces of said plates, as shown in Figs. 3 and 4. The apertures 116 are appreciably greater in diameter than the hub for a purpose hereinafter described; and interposed between said projecting ends of the hub and the end plates 76 and 77 are a series of spaced anti-friction rollers 118 which are mounted in sockets 119 in the peripheral wall of the apertures 116. The sockets extend but part way through the plates 76—77 so that the bottom walls 120 of said sockets prevent inward axial movement of the rollers 118.

Shallow oil casings 121—122, having peripheral flanges 123, are secured to the end plates 76—77 respectively, and close the apertures 116. The internal diameters of the oil casings are substantially the same as that of the apertures 116 in the end plates; and the flanges 123 form abutments to maintain the rollers 118 in their respective sockets.

Spacers 124 are provided between the end faces 117 of the hub and the adjacent wall of the respective oil casing; and bearings 125 are provided in said oil casings 121 and 122 for the shaft 11.

Lubricating oil, under the desired pressure, is fed to the pump 18 through an oil inlet duct 126 extending through one of the oil casings. In the drawings, said inlet is illustrated in the casing 121. See Fig. 3. The oil flows through the spaces between the hub ends and the casing end walls 76—77 filling both oil casings 121 and 122, the oil spaces 86 and the radial vane chambers 109 between the hub 81 and the inner ends of the vanes; thereby forcing the vanes into yielding contact with the outer faces of the chambers 90. Lubrication is thereby furnished directly to the rollers 118 and to the rollers 112 at the inner ends of the vanes; and ducts 127 extending from the inner ends of the vanes to the rollers 110 and 111 provide means for lubricating the same.

The fuel pump 16 is illustrated in detail in Figs. 8, 9 and 10 of the drawings. As shown therein, the pump comprises a suitable casing provided with a pair of arcuate compression chambers, a driven rotor having radially reciprocatable vanes operable in said chambers, together with fuel inlet and discharge ports.

The casing consists of a substantially annular body portion 130 having oppositely disposed arcuate compression chambers 131—131, and end closures 132 and 133 respectively. The hereinbefore mentioned drive shaft 15 for the fuel pump has bearings 134 and 135 provided in the closures 132 and 133 respectively; and fixed to said shaft, as by a key 136, is a rotor 137, fitting snugly between the end closure members 132 and 133, and provided with the radially reciprocatable vanes 138.

The rotor 137 comprises a hub 139 and a pair of arcuate body portions 140—140 joined to said hub by spokes 141 of less width than the hub and body portions, as shown in Fig. 9. The adjacent ends of the opposite body portions 140 are parallel and spaced apart forming guide ways 142 for the vanes 138.

Lubricating oil under suitable pressure is admitted through a duct 143 to the space between the hub 139 and body portions 140, thereby tending to constantly, but yieldingly force the vanes 138 outwardly into contact with the outer walls of the compression chambers 131, which are the inner surfaces of the body portion 130. At diametrically opposite positions, said walls are curved inwardly, as at 145 and 146, to engage the rotor body 140 and form abutments 147 for the ends of said combustion chambers. The curved portions 145, 146 ease the ends of the vanes over said abutments.

The end closure member 132 is formed with spaced walls, providing a fuel chamber 151 into which the fuel supply pipe 21 from the fuel tank 19 discharges. Ports 152 in the inner wall 150 of said chamber communicate with the inlet ends of the compression chambers 131—131 respectively. See Fig. 8.

The end closure 133 is provided with discharge ports 153 communicating with the discharge ends of the compression chambers 131. A receiving casing 154 having a peripheral wall 155 is secured over the closure 133 and is provided with a discharge port 156 through which the fuel under pressure is supplied to the delivery pipe 52 leading to the carburetor 48, and the branch pipe 67 leading to the fuel governor 61.

Ball check valves 157 control the ports 153 and are normally held seated by springs 158. A boss 159 on the inner face of the peripheral wall 155 of the casing, and guide fingers 160 form a cage for the ball to maintain the same in operative position.

While I have described the invention in detail, it is to be understood that the invention is not to be considered limited thereby. What I consider novel and desire to secure by Letters Patent is as follows:

1. In a fuel system for high altitude aircraft, an explosive fuel actuated motor, a fuel tank, a compressed air tank, an air pump for supplying and maintaining air under pressure to said air tank, an air duct leading from said air tank to said motor, a carburetor interposed in said duct, a fuel pump for delivering fuel from said fuel tank to said carburetor under pressure, a fuel pressure governor comprising a cylinder closed at both ends, a piston in said cylinder, a duct connecting one end of said cylinder to the delivery side of said fuel pump, a longitudinally disposed tapered port in the wall of said cylinder increasing in cross-sectional area from the fuel end of said cylinder toward the opposite end, a duct extending from said tapered port to said fuel tank, and a duct connecting the opposite end of said cylinder to the compressed air portion of said system.

2. A fuel system as set forth in claim 1 in combination with a throttle valve in the duct leading to the motor and operator controlled means for optionally actuating the same.

3. In a fuel system for high altitude aircraft, a motor actuated by expansion of explosive fuel, a fuel tank, a compressed air tank, an air pump for supplying and maintaining air under pressure to said air tank, an air duct leading from said air tank to said motor, a carburetor interposed in said air duct, a fuel pump for delivering fuel from said fuel tank to said carburetor under pressure, a by-pass from the fuel delivery side of said pump to said fuel tank, and non-tension means interposed in said by-pass and actuated by variations in the relative pressures in the fuel and air delivered to said carburetor, for controlling the quantity of fuel returned to said fuel tank to maintain a constant uniformity of pressure and richness of the fuel mixture in combination with an inlet air duct for said air pump, a valve in said duct for controlling the quantity of air supplied to said air pump, means normally holding said valve in open position, a cylinder having a closed end, a piston in said cylinder, a duct from the compression side of said air pump to the closed end of said cylinder, and means connecting said piston to said valve whereby variation in air pressure will actuate said valve.

4. In a fuel system for high altitude aircraft, a motor actuated by expansion of explosive fuel, a fuel tank, a compressed air tank, an air pump for supplying and maintaining air under pressure to said air tank, an air duct leading from said air tank to said motor, a carburetor interposed in said air duct, a fuel pump for delivering fuel from said fuel tank to said carburetor under pressure, a by-pass from the fuel delivery side of said pump to said fuel tank, and non-tension means interposed in said by-pass and actuated by variations in the relative pressures in the fuel and air delivered to said carburetor, for controlling the quantity of fuel returned to said fuel tank to maintain a constant uniformity of pressure and richness of the fuel mixture in combination with an inlet air duct for said air pump, a normally open valve in said duct for controlling the quantity of air supplied to said air pump, a cylinder adjacent said valve and having a closed end and an open end, a piston in said cylinder, a duct from the compressed air portion of said system to the closed end of said cylinder, a yoke adjustably mounted at the open end of said cylinder, a rod connected to said piston and operatively connected to said valve, and a spring interposed between said piston and said yoke.

JOHN JOHNSON.

References Cited in the file of this patent
UNITED STATES PATENTS

| Number | Name | Date |
|---|---|---|
| 1,015,411 | Webb | Jan. 23, 1912 |
| 1,204,535 | Augustine | Nov. 14, 1916 |
| 1,510,688 | La Fon | Oct. 7, 1924 |